United States Patent [19]

Powers et al.

[11] Patent Number: 5,487,259
[45] Date of Patent: Jan. 30, 1996

[54] CUTTER ASSEMBLY FOR MOWING APPARATUS

[75] Inventors: Robert L. Powers, Easton, Ill.; Adolf Ibach, Remscheid, Germany

[73] Assignee: Carl Sulberg GmbH & Co., Remscheid, Germany

[21] Appl. No.: 347,039

[22] Filed: Nov. 30, 1994

[51] Int. Cl.⁶ ................................................ A01D 34/17
[52] U.S. Cl. ........................... 56/298; 56/304; 56/311; 411/348
[58] Field of Search ........................ 56/298, 297, 299, 56/303, 304, 305, 306, 307, 308, 309, 310, 311, 236, 259, 264; 411/348

[56] References Cited

U.S. PATENT DOCUMENTS

| 1,945,301 | 1/1934 | Wilson. | |
|---|---|---|---|
| 2,484,652 | 10/1949 | Schoenrock. | |
| 3,455,093 | 7/1969 | Stern | 56/305 |
| 3,514,932 | 6/1970 | Horowitz et al. | 56/298 |
| 3,722,196 | 3/1973 | Templeton | 56/298 |
| 4,387,554 | 6/1983 | Bedogni | 56/298 |
| 4,584,770 | 4/1986 | Sabol | 411/437 X |

FOREIGN PATENT DOCUMENTS

| 1233763 | 5/1960 | France | 56/299 |
|---|---|---|---|
| 2546367 | 11/1984 | France. | |
| 0663801 | 8/1938 | Germany | 411/348 |
| 1507170 | 12/1969 | Germany. | |
| 1816316 | 7/1970 | Germany. | |
| 2343491 | 3/1975 | Germany. | |
| 6603286 | 9/1967 | Netherlands | 56/298 |
| 1155464 | 6/1969 | United Kingdom. | |

Primary Examiner—Terry Lee Melius
Attorney, Agent, or Firm—Gary A. Hecht

[57] ABSTRACT

A cutter assembly for mowing apparatus comprises a sickle guard having individual guards whose guard bodies are connected to a cutter bar via mounting pads. Each guard is provided with a rearward knife slot within which knife sections can move back and forth in a reciprocating manner. Hold-down members are provided to act against an upper face of the knife sections, the hold-down members being formed as ball plungers and are screwed into a front part of a hold-down arm. The hold-down arm at its rearward end is fixed by a base to the cutter bar by means of guard mounting screws.

16 Claims, 2 Drawing Sheets

CUTTER ASSEMBLY FOR MOWING APPARATUS

BACKGROUND OF THE INVENTION

1. Field of the Invention

The invention relates to a cutter assembly for a mowing apparatus. The invention is more particularly concerned with a cutter assembly comprising a plurality of sickle guards arranged side by side, each sickle guard having at least one guard, each guard having a guard body and being releasably fixed at least with its guard body to a cutter bar, a ledger surface on each guard body having lateral guard body cutting edges, knife sections secured to a reciprocable knife back, each knife section having a bottom face, facing said ledger surface, and lateral facets terminating in knife section cutting edges, rigid hold-down arms fixedly mounted to said cutter bar spaced from each other in the longitudinal direction of said cutter bar, each hold-down arm having a front part extending above upper faces of said knife sections.

2. Description of the Prior Art

In one known cutter assembly of this type (GB-Patent 1,155,464) the front parts of the hold-down arms are normally positioned at a distance above the knife sections. It is only during an upward movement of the knife sections that the latter will enter into sliding contact with the front parts; (page 2, lines 104 to 109). The knife sections can rise above the ledger surfaces of the guard bodies by said distance. This will reduce the cutting quality. The knife section cutting edges of each second knife section are positioned upwards, which will lead to increased wear of the hold-down arms.

Similar known cutter assemblies having the same disadvantages are disclosed in U.S. Pat. Nos. 1,945,301 and 2,484,652, FIG. 5.

From U.S. Pat. No. 3,455,093 it is known per se to raise and lower the hold-down arm about a horizontal hinge pin and to press its front part via a replaceable anti-friction rub strip into constant contact with the upper faces of the knife sections. This is achieved through a compression spring which rests on the one hand against a rearward extension of the hold-down arm and on the other hand on a base plate which carries said hinge pin at its forward end. The base plate is screwed to the cutter bar. The pressing force of the rub strip can be adjusted by a screw which is arranged concentrically with said compression spring.

From DE Offenlegungsschrift 1 507 170 several proposals are known per se to resiliently or through screw adjustment raise or lower a hold-down arm relative to the knife sections.

Such screw adjustments are also known per se from U.S. Pat. No. 3,722,196, DE Offenlegungsschrift 1 816 316 and DE 2 343 491 A1.

From FR 2 546 367 A1 it is known per se to use hold-down arms in the form of upper double guards. These upper double guards are supported by the cutter bar with a fixed extension behind the guard mounting screws and with an adjusting screw in front of the guard mounting screws. The hold-down arms may be adjusted relative to the knife sections by concerted, complementary adjustment of the guard mounting screws and the adjusting screws.

SUMMARY OF THE PRESENT INVENTION

It is an object of the present invention to simplify and to improve the means whereby the knife sections are held down.

This object is achieved by the said front part having at least one hold-down element for holding down said knife sections in the direction towards the ledger surface of said guard body, said hold-down element being movable into contact with said knife section upper faces, and said knife section cutting edges lying in said knife section bottom faces.

The holding down of the knife sections has the purpose of achieving and maintaining optimum cutting action between the knife section cutting edges and the guard body cutting edges of the guard bodies which cooperate therewith. If there is too great a distance between these cutting edges transversely to the stroke directions of the knife sections then this leads to the goods to be cut no longer being cut cleanly but rather being squashed or knocked off. This can lead to damage of the mowing apparatus in use and to an increased requirement for drive energy. Furthermore, there is the danger that with unhindered upward movement of the knife sections in use these knife sections could strike against the upper lips of the guards during their reciprocating stroke movement. This could lead to breakage of guards and to damage to the knife sections. The hold-down elements of the present invention can be used with advantage independently of the type of the particular guard and independently of the type of knife sections which are used. Thus, one can even use knife sections with serrated facets without any difficulty.

Each hold-down element is preferably adjustable relative to its front part in the directions towards and away from the knife sections. This gives the advantage that the knife section cutting edges are always brought into the optimum position in relation to the corresponding cutting edges on the guard bodies. As a rule, it is desirable that the undersides of the knife sections press with little force against the ledger surfaces of the guards. Subsequent adjustment can be carried out rapidly and accurately even during the mowing operation.

Preferably, each hold-down element has an external thread and the upper front parts are provided with tap holes into which the hold-down elements are screwed. This results in a particularly simple and easy mounting of the hold-down elements in the front parts. Also, eventual replacement of hold-down elements can be effected with little cost.

Each hold-down element preferably comprises a ball member biased into contact with the upper face of the knife sections by spring means. This gives a functionally reliable and very low friction design for the hold-down elements. They can be formed for example as spring pressured ball adjustment assemblies, so-called ball plungers.

The hold-down elements preferably include stop means for limiting displacement of the ball member from the hold-down element. This reduces wear on the hold-down elements and on the knife sections.

On the respective front part there is preferably provided a hold-down element at least approximately in a plane extending through the centers of the length dimension of the knife sections measured transversely to the stroke directions of the knife sections. In this way, the hold-down elements are in contact with each knife section over a sufficient length. Moreover, this positioning is sufficiently far forward in order to counteract any upward movement of the knife sections in use.

In a preferred embodiment of the invention, a hold-down element is provided on the respective front part over a forward region of the knife sections. This has the advantage that the hold-down elements remain in contact with the knife sections with a comparatively short lever arm. This arrangement is recommended particularly as a supplementary fitting to the arrangement of hold-down elements as described in the preceding paragraph.

BRIEF DESCRIPTION OF THE DRAWINGS

Further features and advantages of the invention will become apparent from the following description of preferred embodiments of cutter assemblies in accordance with the invention which are given by way of example and which are shown in the drawings. In the drawings.

DESCRIPTION OF THE PREFERRED EMBODIMENT

Figure 1:
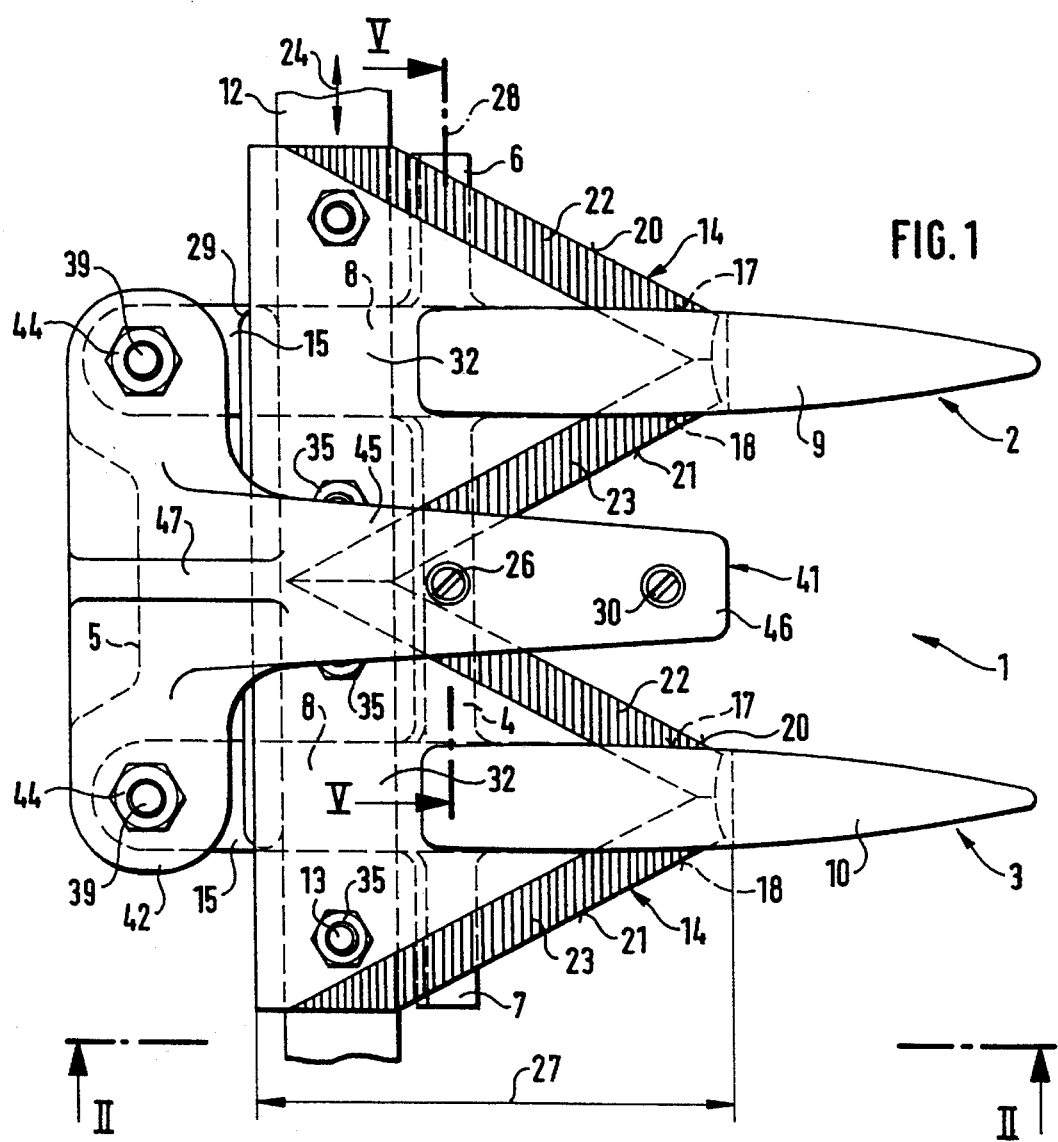
FIG. 1 is the plan view of a sickle guard formed as a double sickle guard and illustrating a first embodiment of the hold-down arm.

The sickle guard 1 of the mowing apparatus shown in FIG. 1 comprises two guards 2 and 3 which are connected rigidly together to form a one-piece double sickle guard, at the front by an inner trash bar 4 and at the back by a connecting web 5. At the level of the inner trash bar 4 each guard 2, 3 carries on the outside an outer trash bar 6 and 7 respectively.

Each guard 2, 3 comprises a guard body 8 and an upper lip 9 and 10 fixed to the guard body 8, at the right-hand side as shown in FIG. 1. Between each guard body 8 and its upper lip 9, 10 there is a knife slot 11 (FIG. 2) to receive knife sections 14 which are secured to a reciprocable knife back 12 by special screws 13 and self-locking special nuts 35. The knife back 12 is supported at the rearward side by a wear bar 29 of the guard bodies 8.

Each guard body 8 is releasably securable via a mounting pad 15 and by means of a guard mounting screw 39 to a cutter bar 40 of the mowing apparatus. The cutter bar 40 has been omitted from FIG. 1 for clarity purposes.

Each guard body 8 has a ledger surface 16 (FIG. 2) with lateral guard body cutting edges 17 and 18 facing the knife sections 14. Each knife section 14 is provided with a bottom face 19 (FIG. 2) and, at the sides, with facets 22 and 23 defining knife section cutting edges 20 and 21. In this case the facets 22, 23 are serrated. The facets could however alternatively be ground smoothly onto the knife sections or could be formed in some other way known per se.

In FIG. 1 the knife sections 14 secured to the knife back 12 are drivable back and forth in stroke directions 24 indicated by a double-headed arrow.

Rigid hold-down arms 41 are mounted on the cutter bar 40 spaced from each other in the longitudinal direction of the cutter bar 40. Each hold-down arm, in the plan view of FIG. 1, is formed substantially T-shaped. A base 42 of the hold-down arm 41 with lateral bores 43 (FIG. 2) is centered on the two guard mounting screws 39 of the double sickle guard 2, 3 and by nuts 44 is screwed to the cutter bar 40 and the mounting pads 15 to form a rigid unit. A center web 45 of the hold-down arm 41 is extending parallel to the guards 2, 3 and into the space therebetween. A front part 46 of the web 45 is arranged above an upper face 32 of the knife sections 14. A rearward hold-down element 26 and a front hold-down element 30, respectively formed as a spring pressured ball adjustment assembly or so-called ball plunger, are screwed into tap holes of the front part 46. The rearward hold-down element 26 is located at least approximately in a plane 28 which passes through the centers of the length dimensions 27 of the knife sections 14 measured transversely to the stroke directions 24 of the knife sections 14. This plane 28 corresponds to the sectional plane according to line V—V in FIG. 1.

At its rear upper side each hold-down arm 41 in its longitudinal center is provided with a stiffening rib 47.

Deviating from the representation according to FIG. 1 the hold-down arms 41 can alternatively be displaced laterally by one pitch. In this case each hold-down arm 41 would be screwed to the adjacent guards of two adjoining double guards. If individual guards are used instead of double guards, each hold-down arm 41 could be screwed to any of two adjoining individual guards.

Figure 2:
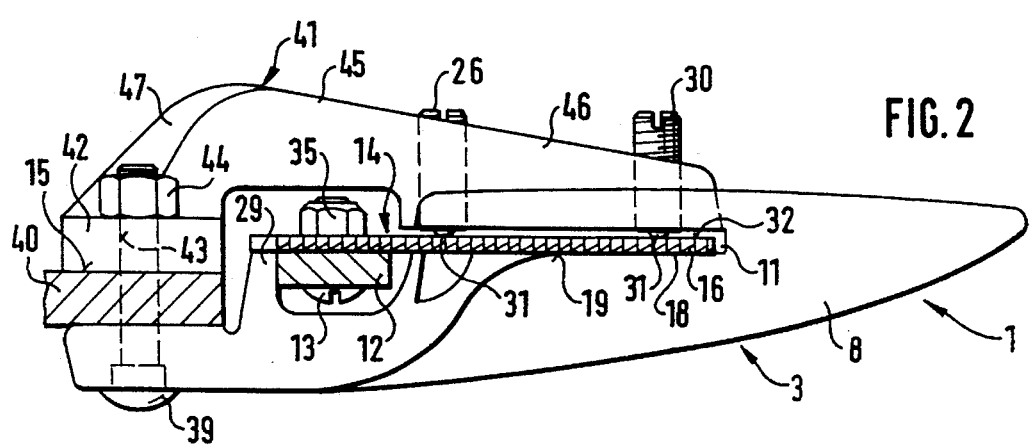
FIG. 2 is the sectional view taken along the line II—II in FIG. 1.
Figure 4:
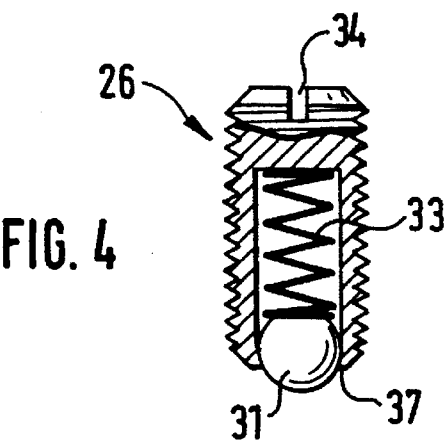
FIG. 4 is a view on an enlarged scale of the circle detail IV in FIG. 3, partly in longitudinal section.

FIG. 2 shows that for each hold-down element 26, 30 a ball 31 is pushed into contact with the upper face 32 of the knife section 14. Each ball 31 is, as shown in FIG. 4, biased into contact with the upper face 32 of the knife section 14 by a compression spring 33 located within the hold-down element 26 which is formed as a screw. The magnitude of the biasing force can be adjusted by introducing a screwdriver into an upper screw slot 34 of each hold-down element 26, 30, and the particular hold-down element 26, 30 can then be rotated relative to the front part 46.

FIG. 2 also shows the design and arrangement of the special screws 13 and the special nuts 35 by which the knife sections 14 are secured to the knife back 12.

As shown in FIG. 4, a screw sleeve of the hold-down element 26 extends down below the horizontal diameter of the ball 31 to form an abutment edge and thus forms a stop 37 which limits the outward movement of the ball 31 from the hold-down element 26.

Figure 5:
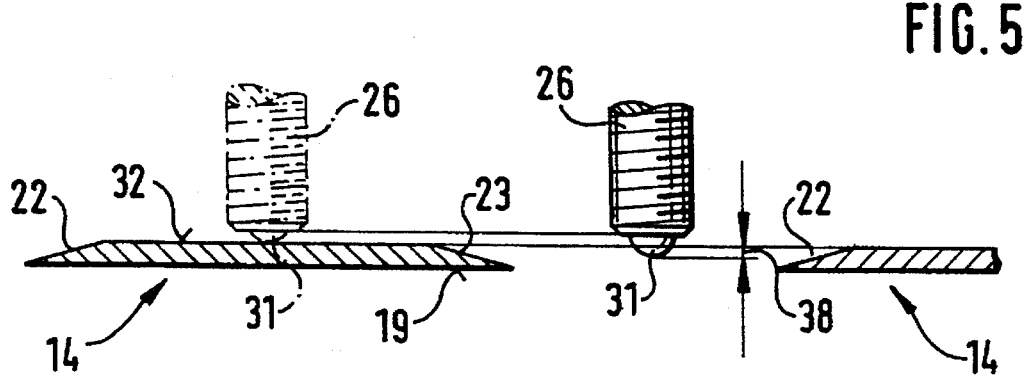
FIG. 5 is a partial sectional view taken along the line V—V in FIG. 1.

This limiting effect is illustrated in FIG. 5, where at the left-hand side, in chain-dotted lines, the ball 31 is shown in contact with the upper face 32 of the knife section 14. In contrast, at the right-hand side of FIG. 5, in solid lines, the ball 31 is shown in the position which it adopts when the ball has run down the facet 23 by a small amount and then has been prevented from further outward movement by the stop 37. This defines a pressure stroke 38 for the ball 31. This pressure stroke 38 can be kept comparatively small.

Figure 3:
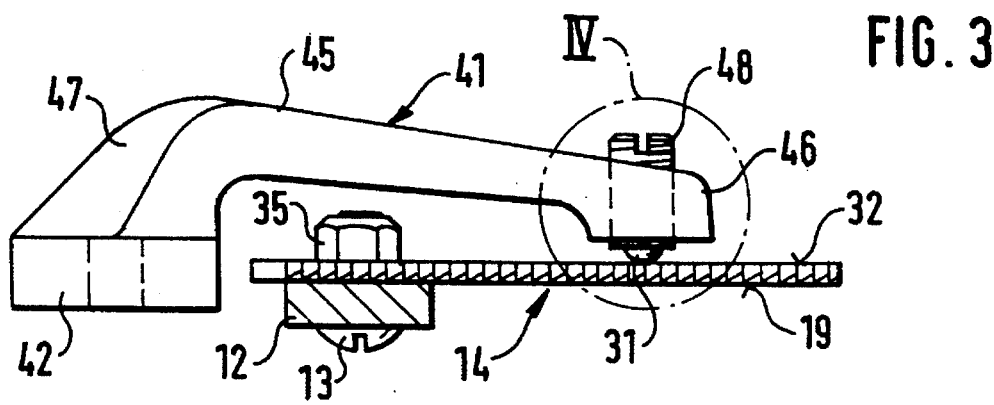
FIG. 3 is a sectional view corresponding to FIG. 2 of another embodiment of the hold-down arm without its guard body.

FIG. 3 shows some parts of another embodiment of the cutter assembly for mowing apparatus. Here only one hold-down element 48 is employed, which is likewise formed as a ball plunger and is screwed into a tap hole of the front part 46. In FIG. 3 the hold-down element 48, in the longitudinal direction of the web 45, is arranged approximately in the middle between the hold-down elements 26, 30 according to FIG. 1. The individual hold-down element 48 according to FIG. 3 could also be positioned further forward towards the hold-down element 30 or further backward towards the hold-down element 28. For the rest the cutter assembly of FIG. 3 corresponds to the cutter assembly shown in the other Figures and is, therefore, not shown again in detail in FIG. 3. In FIG. 3 like parts as in the other Figures are designated by the same reference numerals.

What is claimed is:

1. A cutter assembly for mowing apparatus comprising:

a plurality of sickle guards arranged side by side;

each sickle guard having at least one guard;

each guard having a guard body and being releasably fixed at least with its guard body to a cutter bar;

a ledger surface on each guard body having lateral guard body cutting edges;

knife sections secured to a reciprocable knife back, each knife section having a bottom face, facing said ledger surface, and lateral facets terminating in knife section cutting edges;

rigid hold-down arms fixedly mounted to said cutter bar spaced from each other in the longitudinal direction of said cutter bar;

each hold-down arm having a front part extending above upper faces of said knife sections;

said front part having at least one hold-down element for holding down said knife sections in the direction towards the ledger surface of said guard body, said hold-down element being movable into contact with said knife section upper faces; and said knife section cutting edges lying in said knife section bottom faces.

2. A cutter assembly according to claim 1, in which each said hold-down element is adjustable relative to its front part in the directions towards and away from the knife sections.

3. A cutter assembly according to claim 2, in which each said hold-down element has an external thread, and the front parts have respective tap holes to receive the threaded hold-down elements.

4. A cutter assembly according to claim 1, in which each said hold-down element comprises a ball member and spring means biasing the ball member into contact with the upper face of said knife sections.

5. A cutter assembly according to claim 4, which includes a stop on the hold-down element positioned to engage the ball member and limit displacement of the ball member from the hold-down element.

6. A cutter assembly according to claim 1, in which in the respective front part there is arranged a hold-down element which is at least approximately positioned in a plane extending through the centers of the length dimension of the knife sections measured transversely to the stroke directions of the knife sections.

7. A cutter assembly according to claim 1 which includes a hold-down element provided in the respective front part over a forward region of the knife sections.

8. A cutter assembly according to claim 6 which includes a hold-down element provided in the respective front part over a forward region of the knife sections.

9. A cutter assembly for a mowing apparatus comprising:

a plurality of sickle guards arranged side by side, each sickle guard having at least one guard, and each guard having a guard body and being releasably fixed with its guard body to a cutter bar;

a ledger surface on each guard body having lateral guard body cutting edges;

knife sections secured to a reciprocable knife back, each knife section having a bottom face facing said ledger surface, lateral facets terminating in knife section cutting edges, and an upper face;

rigid hold-down arms fixedly mounted to said cutter bar spaced from each other in the longitudinal direction of said cutter bar, each hold-down arm having a front part extending above said upper face of said knife sections;

a hold-down element disposed in said front part for holding down said knife sections in the direction towards the ledger surface of said guard body, said hold-down element being movable relative to said front part into contact with said knife section upper faces; and wherein said knife section cutting edges lie in said knife section bottom faces.

10. A cutter assembly according to claim 9, in which each said hold-down element is adjustable relative to its said front part in the directions towards and away from the knife sections.

11. A cutter assembly according to claim 10, wherein each said hold-down element has an external thread, and the front parts have respective tap holes to receive the threaded hold-down elements.

12. A cutter assembly according to claim 10, wherein said hold-down element comprises a ball member, and a biasing member disposed in said hold-down element to bias said ball member into contact with the upper face of said knife sections.

13. A cutter assembly according to claim 12, which includes a stop on the hold-down element to limit displacement of the ball member from the hold-down element.

14. A cutter assembly according to claim 10, wherein in the respective front part there is arranged a hold-down element which is at least approximately positioned in a plane extending through the centers of the length dimension of the knife sections measured transversely to the stroke directions of the knife sections.

15. A cutter assembly according to claim 10 which includes a hold-down element disposed in the respective front part over a forward region of the knife sections.

16. A cutter assembly according to claim 14 which includes a hold-down element disposed in the respective front part over a forward region of the knife sections.

* * * * *